(12) United States Patent
Oertley

(10) Patent No.: US 6,540,630 B1
(45) Date of Patent: Apr. 1, 2003

(54) REDUCED SOUND TRANSMITTING SPROCKET FOR TRACK-TYPE MACHINES

(75) Inventor: Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/688,531

(22) Filed: Oct. 16, 2000

(51) Int. Cl.[7] ............ F16H 55/12; F16H 55/14
(52) U.S. Cl. ............ 474/162; 474/161; 474/164; 305/137; 305/199
(58) Field of Search ............ 474/56, 151, 152, 474/160, 161, 162, 163, 164, 901; 305/136, 137, 195, 199; 295/7

(56) References Cited

U.S. PATENT DOCUMENTS

| | | | |
|---|---|---|---|
| 3,899,219 A | * 8/1975 | Boggs | ............ 305/115 |
| 3,934,484 A | * 1/1976 | Bavin | ............ 74/466 |
| 3,996,814 A | * 12/1976 | Weslake | ............ 474/162 |
| 4,752,281 A | 6/1988 | Lammers | |
| 4,881,930 A | 11/1989 | Oertley | |
| 5,456,638 A | * 10/1995 | Osborn | ............ 474/155 |

FOREIGN PATENT DOCUMENTS

| | | | |
|---|---|---|---|
| DE | 10121333 A1 | 12/2002 | |
| JP | 55-742159 | * 11/1980 | ............ F16H/55/30 |

OTHER PUBLICATIONS

Patent Abstract of Japan #2001027307 Pub. Date Jan. 30, 2001.

* cited by examiner

*Primary Examiner*—David A. Bucci
*Assistant Examiner*—Timothy McAnulty
(74) *Attorney, Agent, or Firm*—Calvin E Glastetter; Jeff A Greene; William B Heming

(57) ABSTRACT

A sprocket for supporting and propelling an endless track assembly of a track-type machine. The sprocket has an endless chain which is resiliently mounted to an outer flange of a hub. The chain has outwardly projecting teeth that interact with the endless track assembly to propel the machine. A plurality of drive assemblies are pressed between the endless chain and the flange to resiliently connect the endless chain to the flange of the hub.

7 Claims, 6 Drawing Sheets

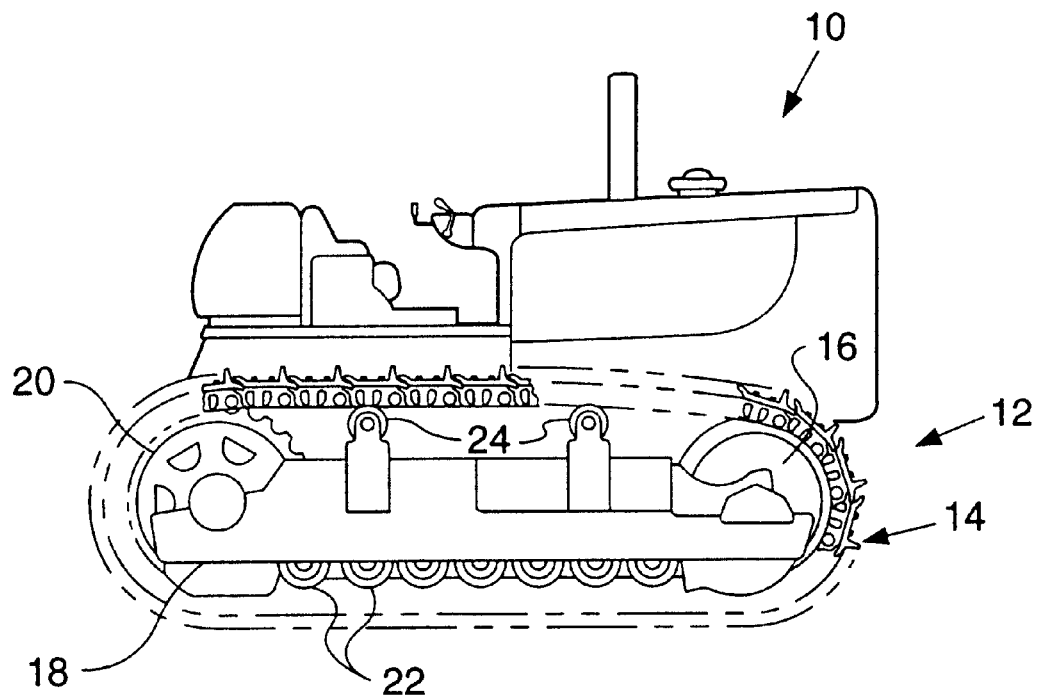

Fig-3-
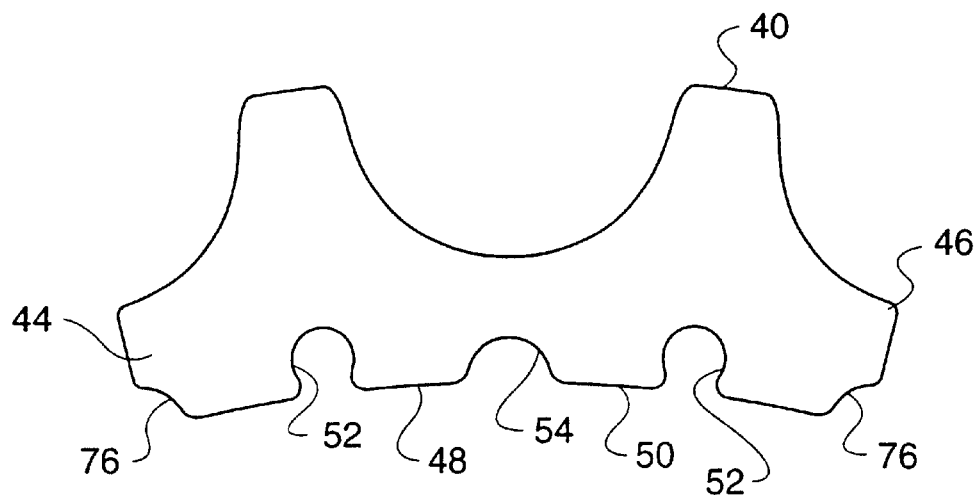
Fig-4-
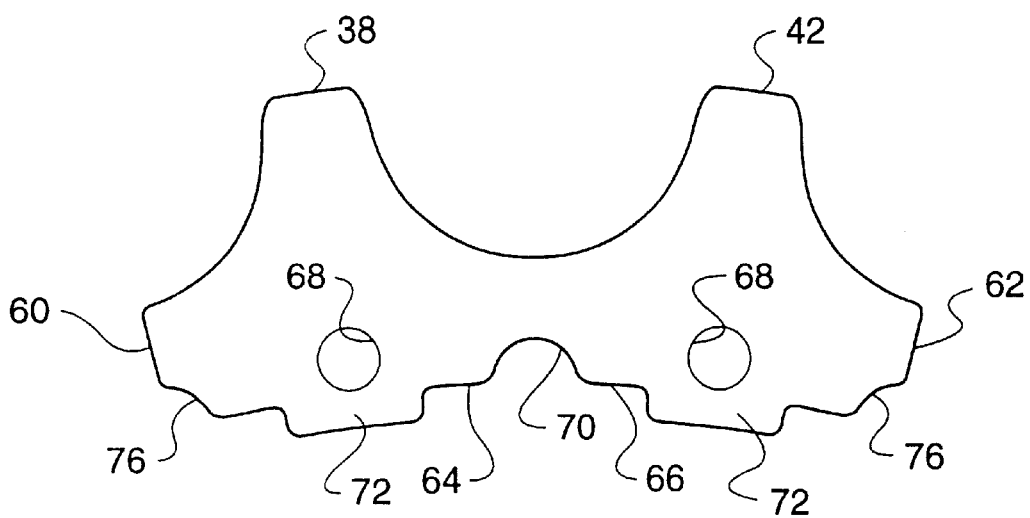

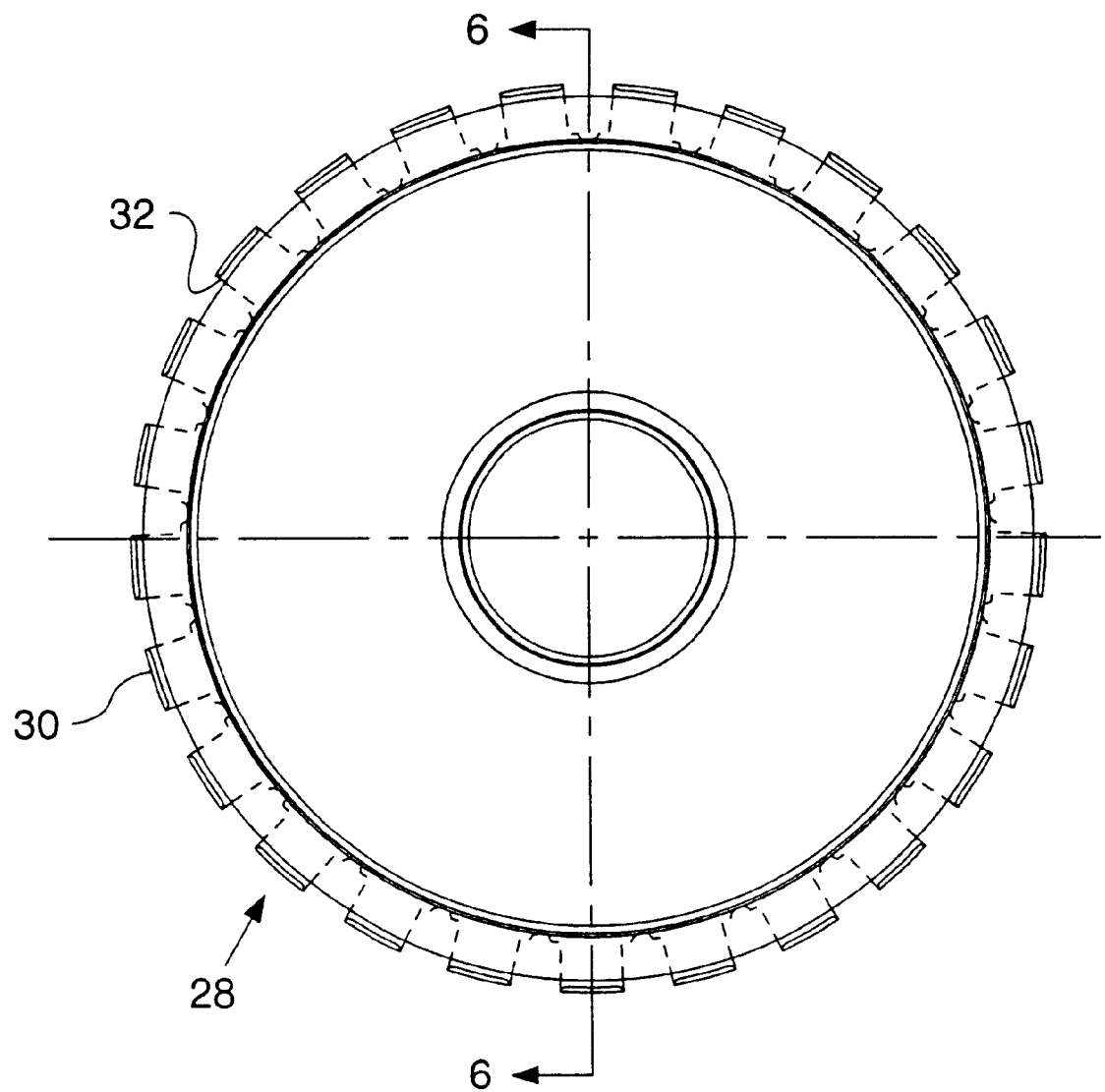

REDUCED SOUND TRANSMITTING SPROCKET FOR TRACK-TYPE MACHINES

TECHNICAL FIELD

This invention relates generally to an undercarriage sound reducing sprocket for track-type machines and more particularly to a sprocket that has teeth resiliently mounted on a hub.

BACKGROUND ART

Environmental regulations, both in the United States and in other countries, are increasingly being directed to the suppression of noise emitted by construction machines such as track-type tractors. In track-type tractors, the undercarriage, such as, track assemblies, drive sprockets and idlers, track rollers, are frequently major contributors to the overall noise of the track type machine.

A great amount of effort has been directed to noise abatement strategies in undercarriage assemblies. For example, U.S. Pat. No. 4,881,930 issued Nov. 21, 1989 to Thomas E. Oertley, titled Sprocket Assembly, and assigned to the Assignee of the present invention, describes a sprocket assembly directed to reducing the noise level of an endless track during operation of a machine. More specifically, Oertley describes a sprocket assembly having a plurality of individually replaceable teeth structures with each tooth structure being resiliently isolated from adjacent tooth structures and from the sprocket support hub. However, such sprocket assemblies appear to be quite complicated and costly and utilize intricately formed pieces.

The present invention is directed to overcome one or more of the problems as set forth above.

DISCLOSURE OF THE INVENTION

In one aspect of the present invention a drive sprocket assembly is provided. The drive sprocket includes a hub and an endless chain is positioned around the hub. The endless chain has a plurality of outwardly projecting teeth. A plurality of drive assemblies mount the endless chain to the hub.

The present invention provides a drive sprocket assembly having teeth that are resiliently mounted to a hub to reduce noise when the machine is being used at a construction site. The sprocket includes arcuate segments which form an endless chain. The endless chain is positioned around a hub and a plurality of resilient drive assemblies are pressed in position between the endless chain and the hub to resiliently mount the endless chain to the hub. Thus the sprocket assembly will produce noise when in use.

BRIEF DESCRIPTION OF THE DRAWINGS

FIG. 1 is a diagrammatic side view of a track-type machine having a reduced sound-transmitting sprocket embodying the present invention;

FIG. 3 is a diagrammatic side view of the outer segments of the endless chain of the sprocket embodying the present invention;

FIG. 4 is a diagrammatic side view of the center segments of the endless chain of the sprocket embodying the present invention;

FIG. 5 is a diagrammatic side view of the hub of the sprocket embodying the present invention;

BEST MODE FOR CARRYING OUT THE INVENTION

Figure 2:
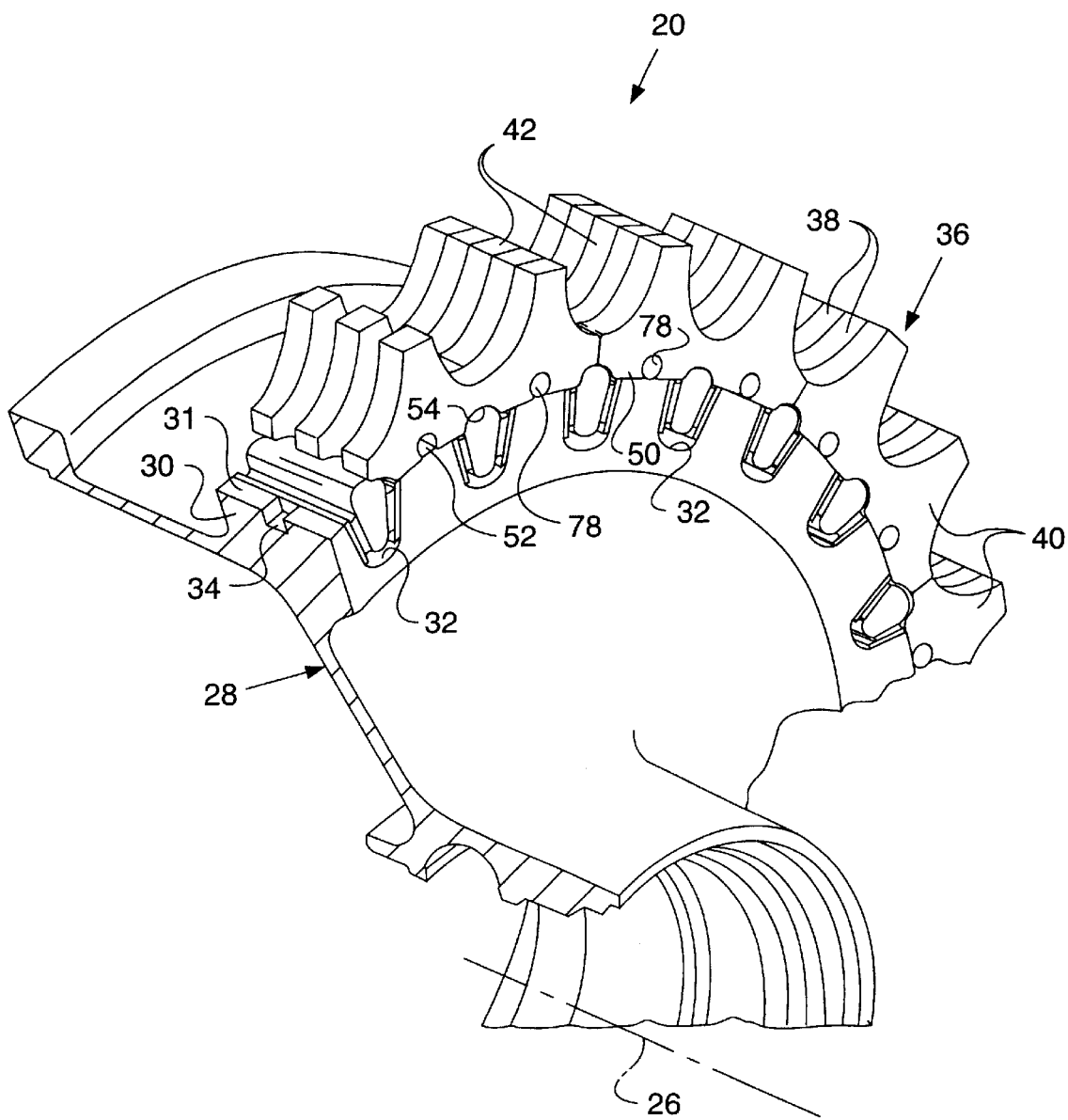
FIG. 2 is an enlarged diagrammatic isometric view of a portion of the sprocket embodying the present invention.
Figure 6:
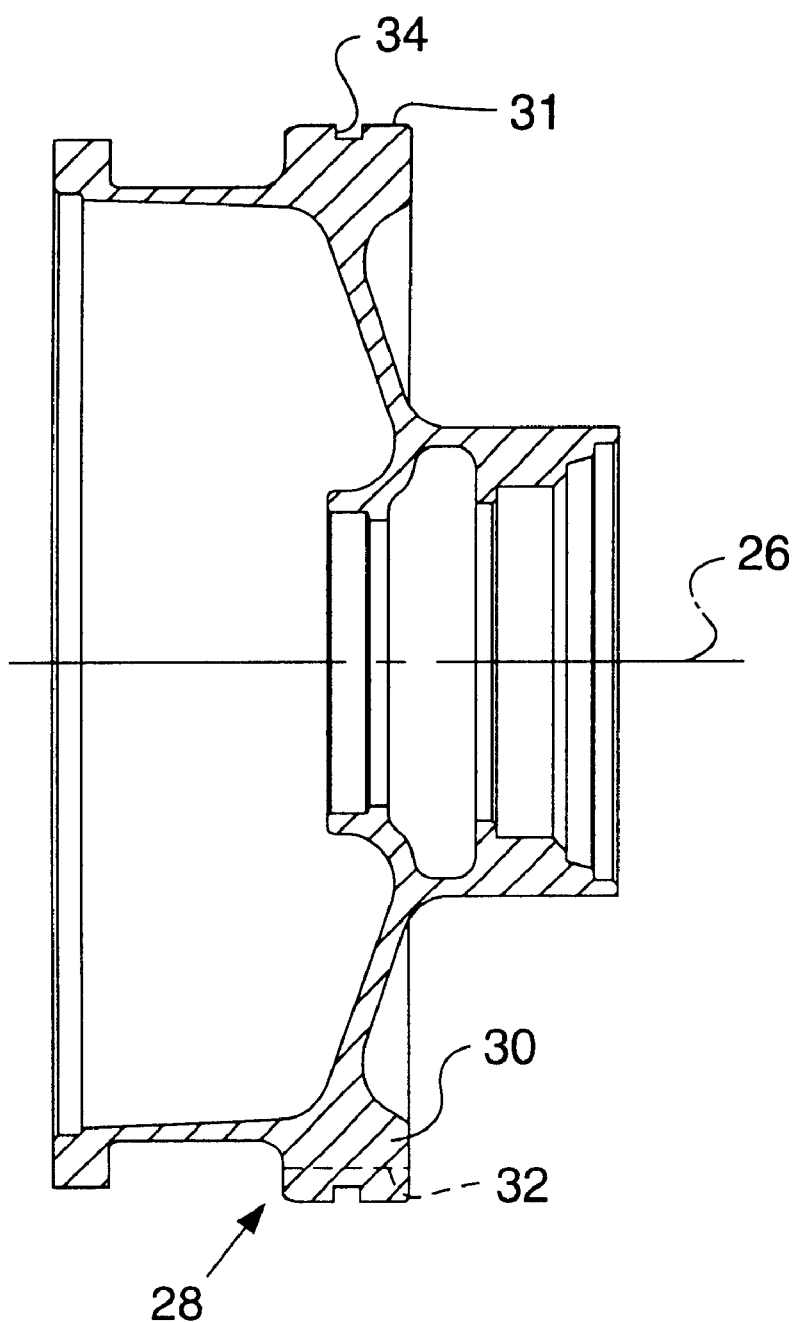
FIG. 6 is a diagrammatic cross-sectional view of the hub of the sprocket embodying the present invention, taken along the line 6—6 of FIG. 5.

FIG. 1 illustrates a track-type machine 10 having a pair of endless track assemblies 12, only one is shown, mounted on respective sides of the machine 10. Each track assembly 12 has an endless track 14 entrained about one or more idlers 16 mounted to a sub-frame 18 and a drive sprocket 20 embodying the present invention is mounted at the rearward end of the machine. The endless track includes conventional pins and bushings. The sub-frame has a plurality of track rollers 22 rotatably mounted thereon, along with a plurality of carrier rollers 24, in a conventional manner.

The sound reducing drive sprocket 20 embodying the present invention is illustrated in FIGS. 2–6. The sprocket 20 rotates about an axis of rotation 26 and has a centrally disposed hub portion 28 which has an annular flange 30 disposed about the outer circumferential periphery of the hub 28. The flange 30 has an outer peripheral surface 31. The annular flange 30 has a plurality of spaced slots 32, which extend in a direction parallel with the axis 26 of the sprocket 20. A groove 34 defined in the outer peripheral surface 31 of the flange 30 extends annually between the slots 32. The slots 32 intersect the annular groove defined about the periphery of the flange 30.

The sprocket 20 includes an endless chain 36 resiliently mounted on the flange 30 of the hub 28. The chain 36 forms a plurality of teeth 38 that interacts with the bushings of the endless track 14 to propel the machine.

The endless chain 36 is formed of a plurality of outer arcuate segments 40 arranged in at least two concentric bands or rows about the flange 30 of the hub 28, and a plurality of center arcuate segments 42 arranged in a single band or row about the flange 30 of the hub 28, as illustrated in FIG. 2.

A typical one of the outer arcuate segments 40 is illustrated in FIG. 3. Each of the outer arcuate segments 40 have a first end portion 44, a second end portion 46, an intermediate portion 48, the radially outward sprocket tooth 38 for contacting the track chain, and a radially inner surface 50 of the arcuate, or curved outer segments 40. The first and second end portions 44, 46 each have an axially oriented circular key slot 52 extending inwardly from the inner surface 50. The intermediate portion 48 has an axially oriented driver slot 54 also extending inwardly from the inner surface 50.

A representative one of the center arcuate segments 42 is shown in FIG. 4. The construction of the center arcuate segments 42 is similar to that of the outer arcuate segment 40. Each of the center segments 42 have a first end portion 60, a second end portion 62, an intermediate portion 64, an arcuately curved outer sprocket tooth 38, and a arcuate inner surface 66. The first and second end portions 60,62 each includes an axially orientated circular hole 68. The intermediate portion 64 includes an axially orientated driver slot 70 extending from the inner surface 64. The first and second end portions 60,62 each includes a radially inwardly extending tab 72 adapted to be received within the annular groove 34 defined in the flange 30 of the hub 28. The driver slots 54, 70 in the outer and inner segments 40,42 is positioned substantially equidistantly between the first ends 44, 60 and the second ends 46,62 and extends inwardly from the radially innermost surface 50,66 of the respective segments 40,42. In addition, each of the outer and center segments 40,42 have a portion 76 of the driver slot 54,70 disposed at each of the first end portion 44, 60 and second end portions 46,62 which cooperate with a leading or following segment 40,42 disposed in the same circular band, or row, to provide a full one of the driver slots 54,70. Thus, each of the segments 40,42 has a full driver slot 54,70 and a pair of partial driver slots 76.

The endless chain 36 is first assembled by itself, and then mounted on the flange 30 of the sprocket hub 28 as illustrated in FIG. 2. Advantageously, the arcuate segments 40,42 are positioned with one of the openings 52,68 adjacent the first end portion 44,60 of one segment being aligned with the opening 52,68 adjacent a second end of an adjacent segment 40,42. Thus, adjacent rows of the segments 40,42 are positioned so that the circular openings 52,68 of one segment is aligned with the other one of the circular openings 52,68 at an opposite end of respective adjacently disposed segments.

The endless chain 36 is then assembled by inserting an articulation pin 78 through the respectively aligned circular openings 52,68 in the outer and inner segments 40,42. The outer ends of each of the articulation pins 78 is desirably welded to the outer surface of the outermost arcuate segment 40. The assembled chain 36 is then installed over the flange 30 by aligning the inwardly extending tabs 72 of the center segments within the slots 32 in the outer flange 30 of the idler hub 28. The chain 36 is then slid axially over the flange 30 until the inwardly extending tabs 72 are axially aligned with the annular groove 34 formed in the flange 30. After the chain 36 is axially aligned on the flange 30, it is rotated radially to bring the driver slots 54,70 of the segments 40,42 into radial alignment with the slot 32 openings in the flange 30. At that position, the inwardly extending tabs 72 of the center segment 42 are positioned in the annular groove 34 between the slots 32.

After alignment of the driver slots 54,70 in each segment 40,42 with the axially extending slots 32 in the flange 30, a plurality of axially extending resilient driver assemblies 80 are pressed into the aligned openings 54,70 and the slots 32. Pressing the driver assemblies into the slots 54, 70 and slot 32 will compress and preload the elastomeric members 86. The endless chain 36 is thereby resiliently supported on the hub 28 by the plurality of driver assemblies within the axially aligned driver slots 54,70 in the segments 40,42 and the slots 32 defined in the flange 30 of the hub 28.

Figure 7:
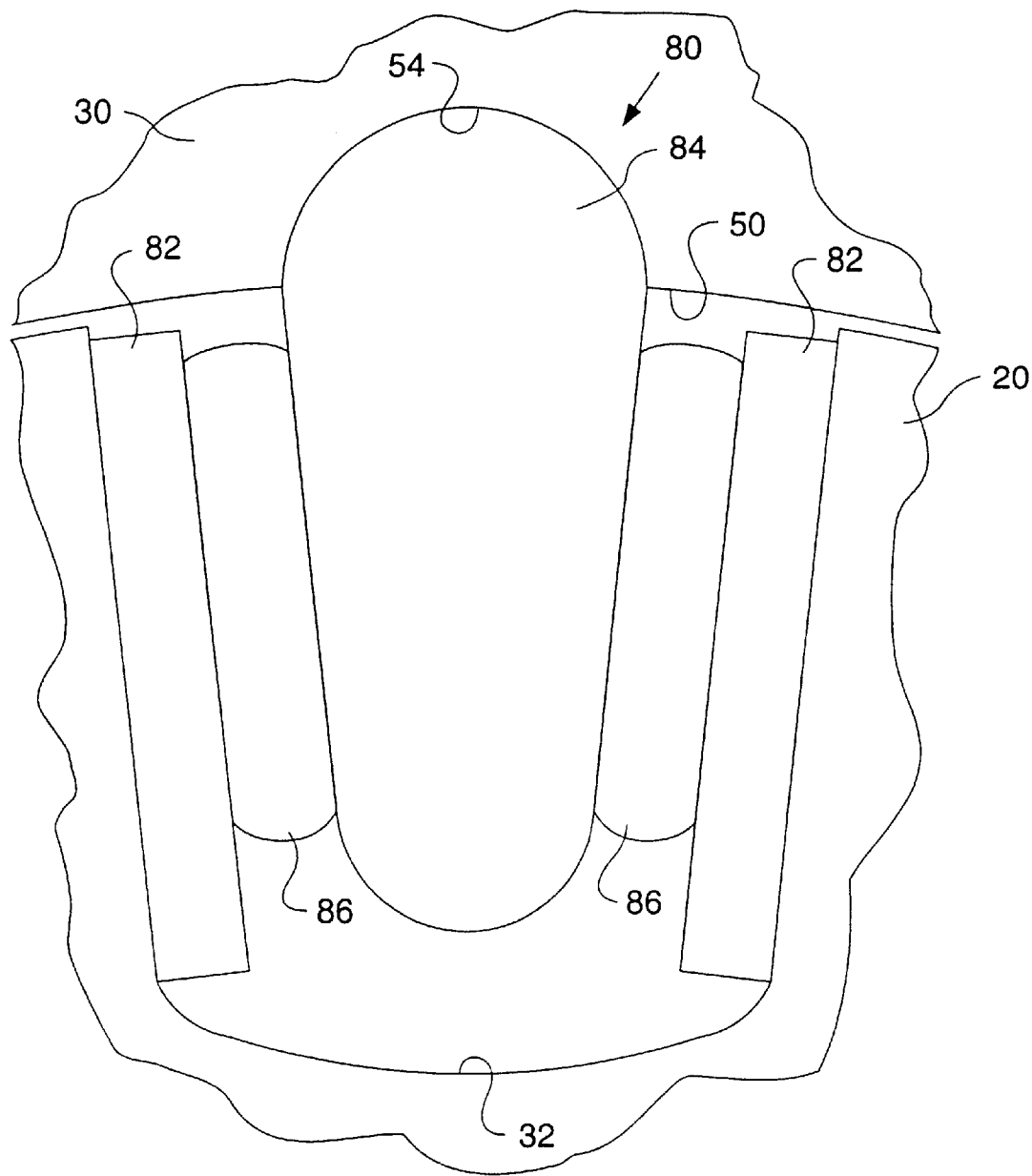
FIG. 7 is an enlarged sectional view of a drive member positioned between the hub and one of the chain segments.

As best shown in FIG. 7, the driver assembly 80 includes a pair of spaced outer members 82, a center member 84 positioned between the outer members 82, a pair of elastomeric members 86, each being bonded to and between one outer member 82 and the center member 84. The outer members 82 are positioned within the slot 32 of the hub 28 for driving purposes. The center member 84 has a circular outer member, which is positioned, within the driver slots 54,70 of the segments 40,42 for driving purposes. One of the elastomeric members 86 is bonded between each outer member 82 and the center member 84 to resiliently mount the chain 36 to the flange 30.

When assembled, the radially innermost surfaces 50,66 of the endless chain 36 are supported a small distance away from the outer surface 31 of the flange 30 by the resilient driver assemblies 80. During operation of the machine 10 and rotation of the sprocket 20, consequent compression of the driver assemblies 80 by the weight of the machine 10 and endless track 14, the amount of deflection of the driver assemblies is limited by the initial free clearance between the surfaces 50,66 of the segments 40, 42 and the outer surface 31 of the flange 30.

In an illustrative embodiment, a radial clearance of about 1–3 mm is provided between the outer surface peripheral surface 31 of the flange and the radially innermost surfaces 50, 66 of the segments 40,42 when assembled on the hub 28. The bottom surfaces of the radially inwardly extending tabs 72 of the center segments 42 are spaced a similar distance from the bottom of the annular groove 34 in the flange 30.

In the illustrated embodiment of the present invention, the endless chain 36 is composed of two rows, or bands of outer segments 40 disposed on each side of a single row or band of center segments 42. In other embodiments, the chain 36 may be composed of fewer segments, for example a single band of outer segments 40 disposed on each side of a central band of center segments 42, or alternatively more than two bands of outer segments 40 on each side of the center band. It is desirable, regardless of the number of adjacent rows, or bands, of segments 40,42 used to form the endless chain 36, that the articulation pins 78 extend through at least three of the segments 40,42 disposed in adjacent relationship about the periphery of the flange 31.

INDUSTRIAL APPLICABILITY

The reduced sound transmitting sprocket 20 embodying the present invention is particularly useful for use in the endless track assemblies of track-type machines working in construction areas that are sensitive to the amount of noise generated by construction machines. The elastomeric driver assemblies 80 positioned between the outer flange 30 of the hub 28 and the segments 40,42 provide an elastomeric cushion support for the endless chain encompassing the sprocket 20. The curved segments of the endless chain 36 provide teeth which interact with the bushing of the endless track to propel the machine.

In view of the foregoing, it is readily apparent that the structure of the present invention provides a sprocket that has an endless chain have teeth that is resiliently mounted to a flange 30 of a hub 28. The drivers provide a cushion support of the endless chain supporting the endless track 14, and thereby effectively reduces noise transmitted by the track assembly.

Other aspects, objects and advantages of this invention can be obtained from a study of the drawings, the disclosure and the appended claims.

What is claimed is:

1. A drive sprocket assembly, comprising:
   a hub having an axis and an annular flange, the annular flange having an outer periphery with a plurality of axially extending slots defined therein;
   an endless chain positioned around the hub and having a plurality of outwardly projecting teeth, a plurality of segments connected together to form the endless chain, the segments each having an accurate inner surface with an axially oriented drive slot, each drive slot extending upwardly from the accurate inner surface; and
   a plurality of driver assemblies resiliently mounting the endless chain to the hub, each drive assembly being positioned within the axially extending slots of the flange and the drive slots in the segments of the endless chain.

2. The drive sprocket assembly of claim 1, wherein the drive assembly includes a pair of spaced outer members, a center member positioned between the outer members and a pair of elastomeric members each one bonded to and between one outer member and the center member to resiliently mount the endless chain to the hub.

3. The drive sprocket of claim 1 wherein the segments include a plurality of outer segments and a plurality of center segments, the outer segments being arranged in at least two concentric rows about the flange.

4. The drive sprocket of claim 3 wherein the hub includes an annular groove defined in the outer periphery and extending between the slots defined in the flange and including inwardly extending tabs on the center segments that interact with the annular grooves to limit axial movement of the endless chain relative to the hub.

5. The drive sprocket assembly of claim 1 wherein the driver assemblies are resilient and support the endless chain a distance from the flange.

6. The drive assembly of claim 1 wherein the segments each include openings and further including a plurality of articulation pins positioned in openings of adjacent outer segments and center segments.

7. The drive assembly of claim 6 wherein each of the pins extends through the openings of at least three segments disposed axially in adjacent relationship about the hub.

* * * * *